United States Patent
Gao et al.

(10) Patent No.: US 12,413,375 B2
(45) Date of Patent: Sep. 9, 2025

(54) METHOD FOR PORT INDICATION FOR UPLINK DATA CHANNELS

(71) Applicant: ZTE Corporation, Shenzhen (CN)

(72) Inventors: Bo Gao, Shenzhen (CN); Zhaohua Lu, Shenzhen (CN); Ke Yao, Shenzhen (CN); Shujuan Zhang, Shenzhen (CN); Zhen He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 384 days.

(21) Appl. No.: 17/868,185

(22) Filed: Jul. 19, 2022

(65) Prior Publication Data
US 2023/0072983 A1    Mar. 9, 2023

Related U.S. Application Data (63) Continuation of application No. PCT/CN2020/073454, filed on Jan. 21, 2020.

(51) Int. Cl.
*H04L 5/00* (2006.01)
*H04W 72/1268* (2023.01)

(52) U.S. Cl.
CPC .......... *H04L 5/0094* (2013.01); *H04L 5/0044* (2013.01); *H04L 5/0048* (2013.01); *H04W 72/1268* (2013.01)

(58) Field of Classification Search
CPC ... H04L 5/0023; H04L 5/0044; H04L 5/0048; H04L 5/0053; H04L 5/0094; H04W 72/1268; H04W 72/23; H04W 72/231; H04W 72/232
See application file for complete search history.

(56) References Cited

U.S. PATENT DOCUMENTS

| | | | |
|---|---|---|---|
| 11,115,962 | B2 | 9/2021 | Kang et al. |
| 2019/0349964 | A1 | 11/2019 | Liou |
| 2020/0280409 | A1* | 9/2020 | Grant .............. H04L 5/0044 |
| 2021/0143956 | A1* | 5/2021 | Lin ................ H04L 5/0035 |
| 2021/0195583 | A1* | 6/2021 | Venugopal ........ H04L 5/0048 |

(Continued)

FOREIGN PATENT DOCUMENTS

| CN | 110034894 A | 7/2019 |
|---|---|---|
| CN | 110326243 A | 10/2019 |

(Continued)

OTHER PUBLICATIONS

Motorola Mobility, et al. "Remaining Details on non-CA NR UL power control" 3GPP TSG RAN WGI #93, R1-1807272, May 25, 2018 (5 pages).

(Continued)

*Primary Examiner* — Pao Sinkantarakorn
(74) *Attorney, Agent, or Firm* — Crowell & Moring LLP (57) ABSTRACT

This disclosure generally relates to port indication for uplink data channel transmissions in wireless communications. In some implementations, a communication node in a wireless communication network, such as a mobile station, may receive a command to trigger transmission of an uplink data channel. The node may determine one or more ports according to a port parameter associated with the uplink data channel. Additionally, the node may transmit the uplink data channel using the one or more ports.

12 Claims, 6 Drawing Sheets

(56) References Cited

U.S. PATENT DOCUMENTS

| | | | | |
|---|---|---|---|---|
| 2022/0132430 A1* | 4/2022 | Hoshino | ............... | H04L 5/0051 |
| 2022/0173878 A1* | 6/2022 | Nory | ....................... | H04L 5/001 |
| 2023/0023719 A1* | 1/2023 | Ji | ........................ | H04W 16/28 |

FOREIGN PATENT DOCUMENTS

| | | | |
|---|---|---|---|
| CN | 110505695 A | 11/2019 | |
| CN | 110536402 A | 12/2019 | |
| EP | 3 567 967 A1 | 11/2019 | |

OTHER PUBLICATIONS

International Search Report and Written Opinion for International Application No. PCT/CN2020/073454 mailed Oct. 29, 2020 (6 pages).

Huawei, "Remaining issues for codebook based transmission for UL MIMO", 3GPP TSG RAN WG1, R1-1807127, May 20, 2018 (4 pages).

European Search Report for European Application No. 20 88 7292 mailed Sep. 13, 2023 (6 pages).

Office Action issued in Chinese Patent Application No. 202080092899.8 dated Jul. 30, 2024, w/English translation, 8 pages.

Samsung, "Discussion on beam indication for UL transmission" 3GPP TSG RAN WG1 Meeting #90, R1-1714517, Aug. 21, 2017, 4 pages.

Samsung, "Discussion on beam indication for UL transmission", 3GPP TSG RAN WG1 Meeting 90bis, R1-1717620, Oct. 9, 2017 (6 pages).

Ericsson, "Enhancements to multibeam operation", 3GPP TSG RAN WG 1 Meeting 98, R1-1909225, Aug. 26, 2019, (22 pages).

CATT, "Correction on timing for MAC CE applicability with HARQ-ACK repetition in 38.214", 3GPP TSG-RAN WG1 Meeting #98bis, R1-1910315, Oct. 14, 2019 (12 pages).

* cited by examiner

METHOD FOR PORT INDICATION FOR UPLINK DATA CHANNELS

CROSS-REFERENCE TO RELATED APPLICATIONS

This application is a continuation of International Patent Application No. PCT/CN2020/073454, filed Jan. 21, 2020. The contents of International Patent Application No. PCT/CN2020/073454 are herein incorporated by reference in their entirety.

TECHNICAL FIELD

This document is directed generally to port indication for uplink data channel transmissions in wireless communications.

BACKGROUND

As the expense of wide or ultra-wide spectrum resources, the considerable propagation loss induced by the extremely high frequency becomes a noticeable challenge. To solve this, antenna array and beam-forming training technologies using massive multiple-input and multiple output (MIMO), e.g., up to 1024 antenna elements for one node, have been adopted to achieve beam alignment and obtain sufficiently high antenna gain. To keep low implementation cost while still benefit from antenna array, analog phase shifters become very attractive for implementing mmWave beam-forming, which means that the number of controllable phases is finite and the constant modulus constraints are placed on these antenna elements. Given the pre-specified beam patterns, the variable-phase-shift-based beam-forming training targets are implemented to identify the best pattern for subsequent data transmission generally, in the one-total radiated power (TRP) and one-panel case.

SUMMARY

This document relates to methods, systems, and devices for port indication for uplink data channel transmissions.

In some implementations, a method for wireless communication is disclosed. The method may include: receiving, by a first communication node from a second communication node, a command to trigger transmission of an uplink data channel; determining, by the first communication node, one or more ports according to a port parameter associated with the uplink data channel; and transmitting, by the first communication node, the uplink data channel using the one or more ports.

In some other implementations, a method for wireless communication is disclosed. The method may include: transmitting, by a second communication node to a first communication node, a command to trigger transmission of an uplink data channel; and receiving, by the second communication node, the uplink data channel, wherein one or more ports of the uplink data channel is determined according to a port parameter associated with the uplink data channel.

In some other implementations, a network device is disclosed. The network device may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above and other aspects and their implementations are described in greater detail in the drawings, the descriptions, and the claims.

DETAILED DESCRIPTION

The present description describes a port indication for transmission of an uplink data channel. For some embodiments or methods, the port indication may be used with a unified beam indication framework for mobile communications between one or more mobile stations and a wireless access node, which may allow or enable a mobile terminal to have a common set of communication parameters that the mobile terminal uses to communicate with the base station for control and data uplink transmissions and downlink receptions.

Figure 1:
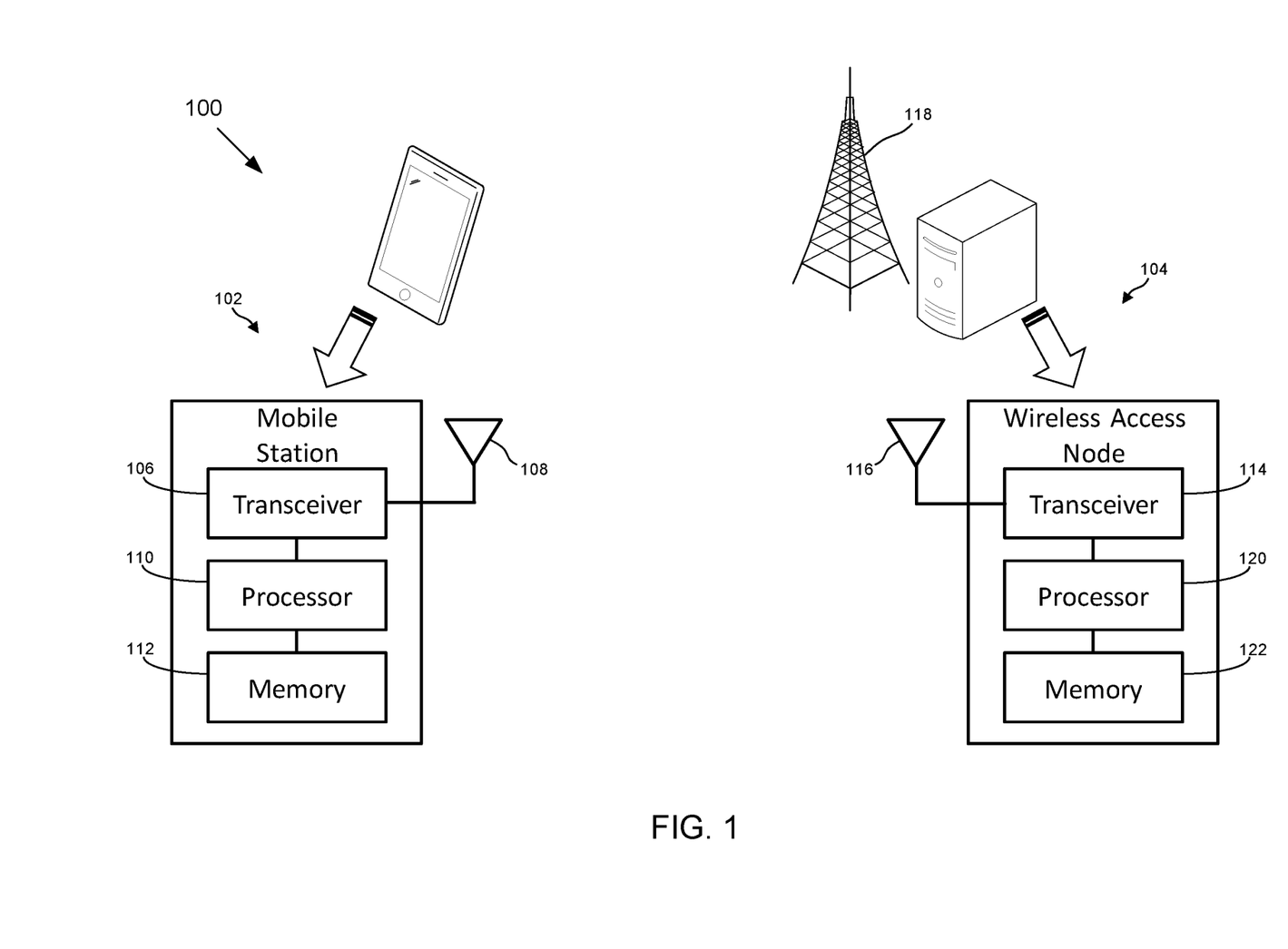
FIG. 1 shows an example of a wireless communication system.

FIG. 1 shows a diagram of an example wireless communication system 100 including a plurality of communication nodes that are configured to wirelessly communicate with each other. The communication nodes include a mobile station 102 and a wireless access node 104. The example wireless communication system 100 in FIG. 1 is shown as including only one mobile station 102. However, various other numbers of mobile stations, including two or more mobile stations, may be possible for other configurations of the wireless communication system 100. Also, the number of mobile stations 102 communicating with the wireless access node 104 may vary over time.

The mobile station 102, which may comprise or otherwise be referred to as a mobile terminal or a user equipment (UE), and may be or include, but not limited to, a mobile phone, smart phone, tablet, laptop computer, or other mobile devices that are capable of communicating wirelessly over a network. The mobile station 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless access node 104 may comprise a base station or other wireless network access points capable of communicating wirelessly over a network with one or many mobile stations. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, in various embodiments. The wireless access node 104 may include transceiver circuitry 114 coupled to an antenna 116, which may include an antenna tower 118 in various approaches, to effect wireless communication with the mobile station 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

The mobile station 102 and the wireless access node 104 may be configured to wirelessly communicate with each other in or over a mobile network and/or a wireless access network according to one or more standards and/or specifications. In general, the standards and/or specifications may define the rules or procedures under which the mobile station 102 and the wireless access node 104 can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the mobile station 102 and the wireless access node 104 are configured to wirelessly communicate signals between each other. In general, a communication in the wireless system 100 between two communication nodes can be or include a transmission or a reception, and is generally both simultaneously, depending on the perspective of a particular node in the communication. For example, for a communication between a first node and a second node where the first node is transmitting a signal to the second node and the second node is receiving the signal from the first node, the communication may be considered a transmission for the first node and a reception for the second node.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways in order to communicate with each other, or otherwise controls how the communication nodes communicate data signals with each other. Also, particular signals can be characterized or defined as either an uplink (UL) signal or a downlink (DL) signal. An uplink signal is a signal transmitted from the mobile station 102 to the wireless access node 104. A downlink signal is a signal transmitted from the wireless access node 104 to the mobile station 102. Also, certain signals may defined or characterized by combinations of data/control and uplink/downlink, including uplink control signals, uplink data signals, downlink control signals, and downlink data signals.

For at least some specifications, such as 5G NR, an uplink control signal includes a physical uplink control channel (PUCCH), an uplink data signal includes a physical uplink shared channel (PUSCH), a downlink control signal includes a physical downlink control channel (PDCCH), and a downlink data signal includes a physical downlink control channel (PDCCH).

Also, some signals communicated in the system 100 may be defined or characterized as reference signals (RS). In general, a reference signal may be recognized in the system 100 as a signal other than a data signal or a control signal, although a reference signal may be an uplink reference signal or a downlink reference signal. Non-limiting examples of reference signals used herein, and as defined at least in 5G NR, include a demodulation reference signal (DM-RS), a channel-state information reference signal (CSI-RS), and a sounding reference signal (SRS). A DM-RS is used for channel estimation to allow for coherent demodulation. For example, a DMRS for a PUSCH transmission allows the wireless access node 104 to coherently demodulate the PUSCH. A CSI-RS is a downlink reference signal used by the mobile station 102 to acquire downlink channel state information (CSI). A SRS is an uplink reference signal transmitted by the mobile station 102 and used by the wireless access node 104 for uplink channel-state estimation.

Additionally, a signal may have an associated resource that, in general, provides or identifies time and/or frequency characteristics for transmission of the signal. An example time characteristic is a temporal positioning of a smaller time unit over which the signal spans, or that the signal occupies, within a larger time unit. In certain transmission schemes, such as orthogonal frequency-division multiplexing (OFDM), a time unit can be a sub-symbol (e.g., a OFDM sub-symbol), a symbol (e.g., a OFDM symbol), a slot, a sub-frame, a frame, or a transmission occasion. An example frequency characteristic is a frequency band or a sub-carrier in or over which the signal is carried. Accordingly, as an example illustration, for a signal spanning N symbols, a resource for the signal may identify a positioning of the N symbols within a larger time unit (such as a slot) and a subcarrier in or over which the signal is carried.

In addition, for at least some example configurations, a RS resource is of a first type or of a second type. A first type of RS resource may be referred to as a reference RS resource. A reference RS resource is a RS resource used with a second type of RS resource, referred to as a target RS resource or a target channel resource, to provide a spatial relation (or spatial relation information) for a target RS or a target channel. A target RS or a target channel is a signal to be communicated or transmitted between two communication nodes. Also, a spatial relation between a target RS or channel and a reference RS identifies a spatial feature that is the same or quasi co-located between the target RS or channel and the reference RS. Example spatial features include a beam, a spatial parameter, or a spatial filter (also referred to as a spatial domain filter). A spatial feature can be either on the mobile terminal side (e.g., UE-side) or on the base station side (e.g., gNB-side). In various embodiments, a reference RS can be a downlink (DL) signal, such as a synchronization signal (SS) block or a CSI-RS, or an uplink (UL) signal, such as a SRS.

In the present description, when implemented in accordance with a unified beam indication framework, the mobile station 102 includes, stores, has access to, is configured with, and/or is configured to generate one or more communication parameter sets. In general, a communication parameter set (CPS) is a set of one or more parameters that a mobile station uses to communicate signals, including transmit signals and receive signals. In at least some embodiments, some or all of the parameters are defined by and/or used in accordance with 5G NR. In addition or alternatively, a CPS comprises one or more quasi co-location (QCL) states. For at least some example configurations, a CPS is further associated with (such as by including, being linked with, identifying, and/or indicating) and at least one of: one or more power control parameters, one of more port parameter, or one or more reference signal (RS) resources.

Additionally, in various embodiments, a CPS includes, is associated with, and/or comprises one or more transmission configuration indicator (TCI) states, a spatial relation (also referred to as spatial relation information), one or more reference signals (RS), one or more spatial filters, and/or one or more sets of pre-coding information. Also, for at least some embodiments, a TCI state is the same as, or equivalent to, a TCI codepoint or a QCL state. Also, for at least some embodiments, a CPS is the same as, or equivalent to, a TCI state.

In addition, as used herein, a QCL state is a set of one or more RS resources and a corresponding set of one or more QCL type parameters. Additionally, QCL type parameters include Doppler spread, Doppler shift, delay spread, average delay, average gain, or a spatial parameter. Also, a QCL type-D parameter is the same as, or equivalent to, a spatial parameter or a spatial receiver (Rx) parameter.

Also, a power control parameter includes at least one of: target power (also referred to as P0), a path loss RS, a scaling factor for path loss (also referred as an alpha), or a closed loop process. For at least some example configurations, the path loss is a couple loss. Additionally, the mobile station 102 may use different or multiple power control parameters for different or multiple types of signal transmission. For example, the mobile station 102 may use an uplink data power control parameter for an uplink data transmission (e.g., a PUSCH power control parameter for a PUSCH transmission), an uplink control power control parameter for an uplink control transmission (e.g., a PUCCH power control parameter for a PUCCH transmission), and/or an uplink RS power control parameter for an uplink RS transmission (e.g., a SRS power control parameter for a SRS transmission). As used herein, and unless specified otherwise, the term "power control parameter" can include a power control parameter for one type of transmission or multiple types of transmission.

Addition, a port parameter includes at least one of: a number of one or more ports, a mapping between the one or more ports and one or more reference signal (RS) ports; a set of candidate transmit precoder matrix indicators (TPMI), a number of transmission layers for a channel, or one or more sounding reference signal (SRS) resources for a channel.

Figure 2A:
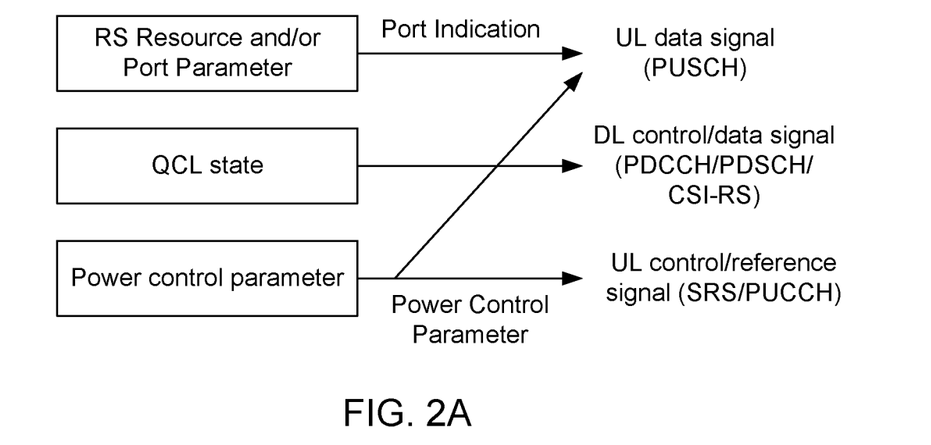
FIG. 2A shows an example of a general transmission framework for a mobile station of FIG. 1.

FIG. 2A shows a diagram of a general transmission framework for the mobile station 102, which indicates the parameters that the mobile station is to determine to transmit an uplink signal or receive a downlink signal. As shown in FIG. 2A, when the mobile station 102 is to transmit a target uplink data signal (e.g., a PUSCH), the mobile station 102 is to determine a port indication for the target uplink data signal that indicates one or more uplink data ports at which to transmit the target uplink data signal, and a power control parameter. The mobile station 102 may determine the port indication based on a RS resource (e.g., a SRS resource, or a reference RS resource) and/or a port parameter. In addition, when the mobile station 102 is to transmit an uplink reference signal (e.g., a SRS) or an uplink control signal (e.g., a PUCCH), the mobile station 102 may determine a power control parameter. Also, when the mobile station 102 is to receive a down link control, data, or reference signal (e.g., a PDCCH, PDSCH, or CSI-RS), the mobile station 102 may determine a QCL state. Upon determining the pertinent parameters (RS resource, port parameter, QCL state, and/or power control parameter), the mobile station 102 may then transmit or receive a target uplink or downlink control/data/reference signal according to the determined parameters.

Figure 2B:
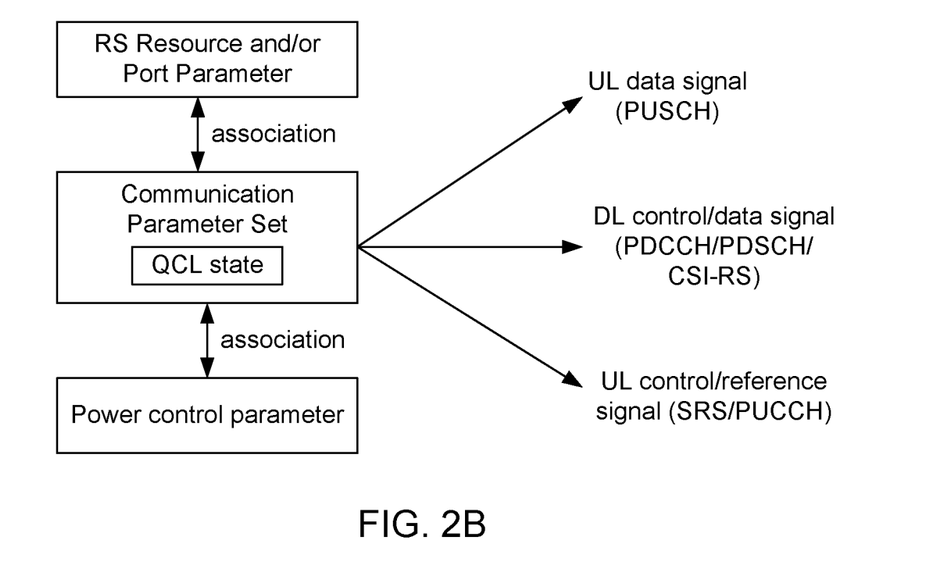
FIG. 2B shows an example of a unified transmission framework for the mobile station of FIG. 1.

FIG. 2B shows a diagram of a unified transmission framework for the mobile station 102. The unified transmission framework is implemented by configuring the mobile station 102 with one or more communication parameter sets. The one or more communication parameter sets provides a common set or group of parameters that the mobile station 102 uses to perform both uplink and downlink transmissions. Accordingly, as shown in FIG. 2B, a communication parameter set that includes a QCL state that includes a second RS resource and one or more corresponding QCL parameters, is further associated with at least one of a first RS resource, a port parameter, or a power control parameter. When the association is made, the mobile station may transmit or receive one or more uplink data or control signals and/or one or more downlink data or control signals (e.g., any or all of PUSCH, PDCCH, PDSCH, CSI-RS, SRS, PUCCH) according to the communication parameter set.

Such a unified transmission framework may be desirable for situations where configuring the mobile station 102 for uplink and downlink communications separately is not necessary. For such situations, configuring the mobile station 102 with the unified transmission framework, rather than doing so separately for UL and DL communications, may reduce the overhead and signaling required to configure the mobile station 102 for both UL and DL communications. Additionally, the unified framework leverages spatial relation information, which supports beam indication for uplink control channel and reference signal transmissions (e.g., PUCCH and SRS), and beam indication for uplink data channels (e.g. PUSCH), which may be achieved through mapping between one or more SRS resources indicated by the wireless access station 104 and antenna ports of the uplink data channels. As a result, beam configurations for uplink data channels may be derived from the spatial relation information and mapping information between RS resources and RS antenna ports.

The present description describes various port indications for transmission of an uplink data channel. At least some of the various ways may be utilized by the mobile station 102 in conjunction with the unified transmission framework, and/or the mobile station 102 may use the unified transmission framework, including the associated communication parameter set, to determine a port parameter for an uplink data channel transmission (e.g., a PUSCH transmission). In order to have a unified transmission framework, downlink reference signals may be configured or indicated as reference signals for a spatial relation for an uplink data channel. Consequently, the SRS resource indicator (SRI) field in a DCI command scheduling the uplink data channel transmission should be removed. However, if the SRI field is removed, then the mobile station 102 is unable to determine the port parameter for the uplink data channel transmission from the SRI field. Accordingly, the following ways enable the mobile station to determine the port parameter for an uplink data channel transmission without a SRI field from a DCI command.

Figure 3:
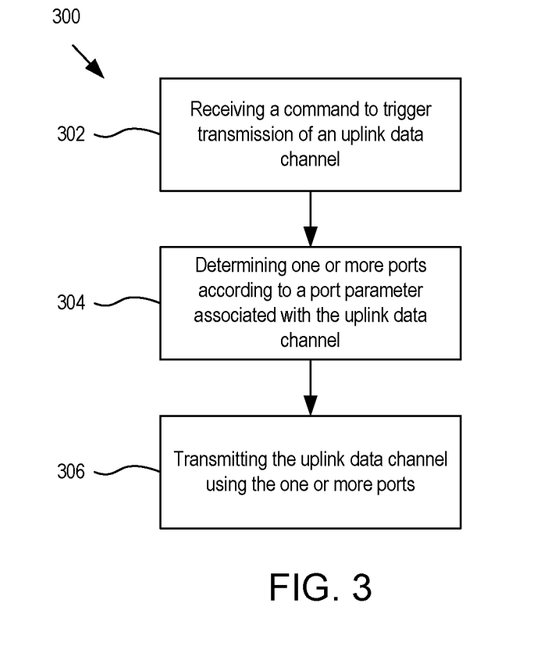
FIG. 3 is a flow chart of an example of a wireless communication method.

FIG. 3 shows a flow chart of an example method 300 for wireless communication. At block 302, the mobile station 102 may receive a command to trigger transmission of an uplink data channel. For at least some example methods, the uplink data channel is or includes a PUSCH.

At block 304, the mobile station 102 determines one or more ports according to a port parameter associated with the uplink data channel. For at least some example methods, the port parameter includes at least one of: a number of ports, an entry of precoding information and number of layers, one or more RS ports, and one or more first RS resource. At block 306, the mobile station may transmit the uplink data channel using the one or more ports that the mobile station 102 determined from the port parameter associated with the uplink data channel.

The mobile station 102 comprises a number of antenna ports in practice (which is also called radio link chains), and the antenna ports can be observed by the mobile station 102 through transmitting a reference signal (e.g., an SRS) using the antenna ports. Subsequently, one uplink data channel transmission is scheduled by the wireless access node 104 to the mobile station 102 with a command comprising a port indication. According to the port indication, some of the antenna ports can be used for the uplink data channel transmission. Specifically, the antenna ports that the mobile station 102 uses for transmitting the uplink data channel are the same as the antenna ports of the reference signal indicated by the port indication.

For at least some example methods, the channel triggering the uplink data channel transmission may include a DCI command scheduling the transmission. However, rather than use information in the DCI command, such as information in the SRI field of the DCI command, to determine the port(s) for the transmission, the mobile station 102 instead derives the ports from the port parameter associated with the uplink data channel, as described for block 304.

For some example methods, the mobile station 102 may receive a RRC signal or a MAC-CE signal, and determine the port parameter from, such as directly from, the RRC or MAC-CE signal.

For other example methods, the mobile station 102 associates the port parameter with a communication parameter set that includes at least a RS source and a QCL type parameter. For such example methods, the triggering command indicates the communication parameter set, and the mobile station 102 identifies the port parameter associated with the communication parameter set in response to the command. In turn, the mobile station may determine the one or more ports for the uplink data transmission to be the same as, or at least include, one or more ports of the port parameter associated with the communication parameter set.

In addition or alternatively, for at least some example methods, the port parameter includes one or more SRS ports in one or more SRS resources. For at least some of these example methods, the mobile station 102 may receive a RRC signal or a MAC-CE signal that includes the one or more SRS resource and/or that configures the one or more SRS resources in the mobile station 102 (such as within the memory 112 of the mobile station 102). The mobile station 102 may determine the one or more ports for the uplink data transmission to be the same as, or at least include, the one or more SRS ports in the one or more SRS resources.

In addition, for at least some of the example methods where the mobile station 102 determines the one or more ports for the uplink data transmission to be the same as, or at least include, the one or more SRS ports in one or more SRS resources, the mobile station 102 may associate the one or more SRS resources with a communication parameter set, such as one that includes a second RS resource and a QCL type parameter, as previously described. For at least some of these methods, the command to trigger the uplink data transmission indicates the communication parameter set, such as by including an ID of the communication parameter set for example. In response to the command, the mobile station 102 identifies the communication parameter set indicated by the command, and in turn, identifies the one or more SRS ports in the one or more SRS resources associated with the communication parameter set. In turn, the mobile station 102 determines the one or ports for the uplink data channel transmission to be the same as the one or more SRS ports in the one or more SRS resources associated with the communication parameter set. For at least some of these methods, the command includes a communication parameter set field.

In addition, for at least some of these methods where the mobile station uses one more SRS resources for determining the port(s) for the uplink data transmission, the mobile station 102 may determine a spatial relation of a SRS resource of the one or more SRS resources according to the communication parameter set, and/or the second RS resource in the communication parameter set. For at least some of these methods, the mobile station 102 may further determine the spatial relation according to a hybrid automatic repeat re-quest-acknowledgment (HARQ-ACK) corresponding to a physical downlink shared channel (PDSCH) carrying the MAC-CE signal; an occasion or instance of the SRS transmission; or a downlink control information (DCI) command triggering the SRS transmission occasion, wherein the SRS transmission occasion is aperiodic. In particular methods where the mobile station 102 determines the spatial relation according to a transmission occasion, the SRS transmission occasion occurs no earlier than or after the first slot that is after a first slot after slot $n+3N_{slot}^{subframe,\mu}$, where the HARQ-ACK corresponding to the PDSCH carrying the MAC-CE signal is transmitted in slot n and $N_{slot}^{subframe,\mu}$ is the number of orthogonal frequency-division multiplexing (OFDM) symbols per subframe for subcarrier spacing configuration μ.

For at some methods, the mobile station 102 may determine a plurality of communication parameter sets. The mobile station 102 may then select a communication parameter set from among the plurality of communication parameter sets. In particular methods, the command triggering the uplink data channel transmission identifies which communication parameter to select. Upon making the selection, the mobile station 102 identifies the one or more ports to use for the uplink data channel transmission.

Figure 4:
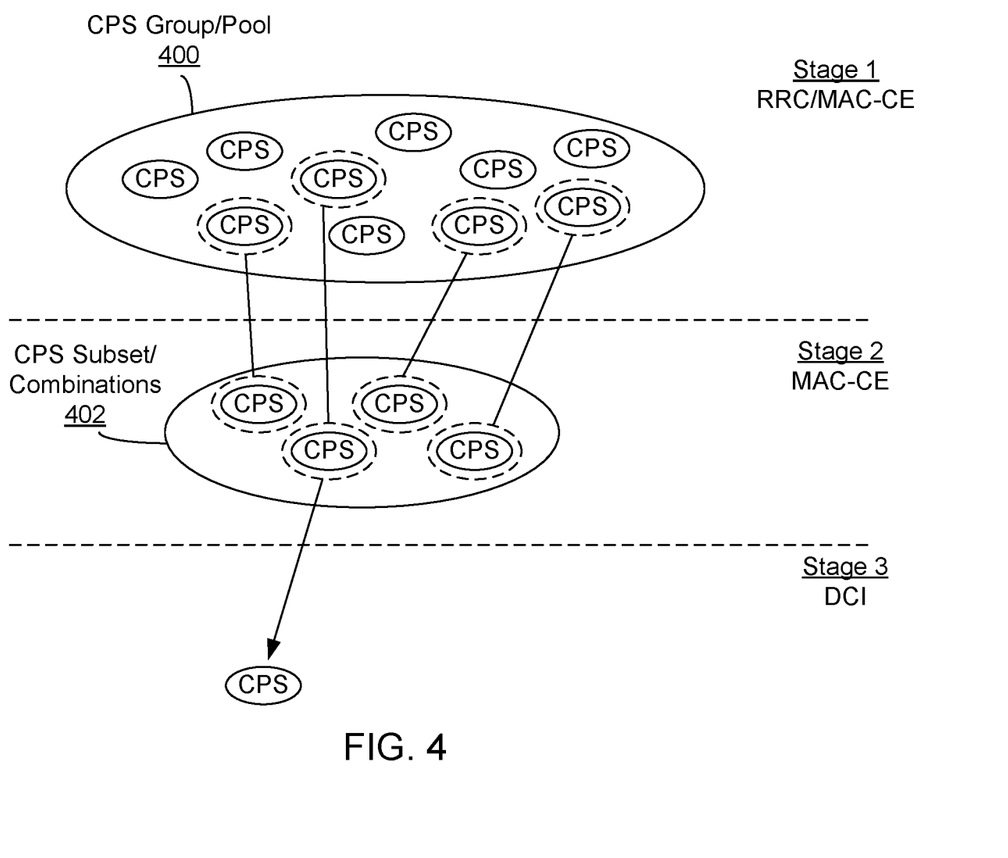
FIG. 4 is a diagram illustrating selection of a communication parameter set.

For at least some of these methods where the mobile station 102 selects a communication parameter set from a plurality, the mobile station 102 may first determine one or more subsets of communication parameter sets from the plurality. The mobile station 102 may then select a communication parameter set from a subset in order to determine the one or more port parameters. FIG. 4 shows a diagram, illustrating an example three-stage selection process. In a first stage, the mobile station 102 determines a plurality (such as a group or pool 400) of communication parameter sets. In a second stage, the mobile station 102 determines a subset 402 of the plurality of communication parameter sets. In a third stage, the mobile station 102 selects a communication parameter set from the subset. Any of various commands/signals may be received, or otherwise used, by the mobile station 102 to determine the plurality of communication parameter sets, the subset(s), and make the selection, including one or more RRC commands, MAC-CE commands, and/or DCI commands.

Figure 5:
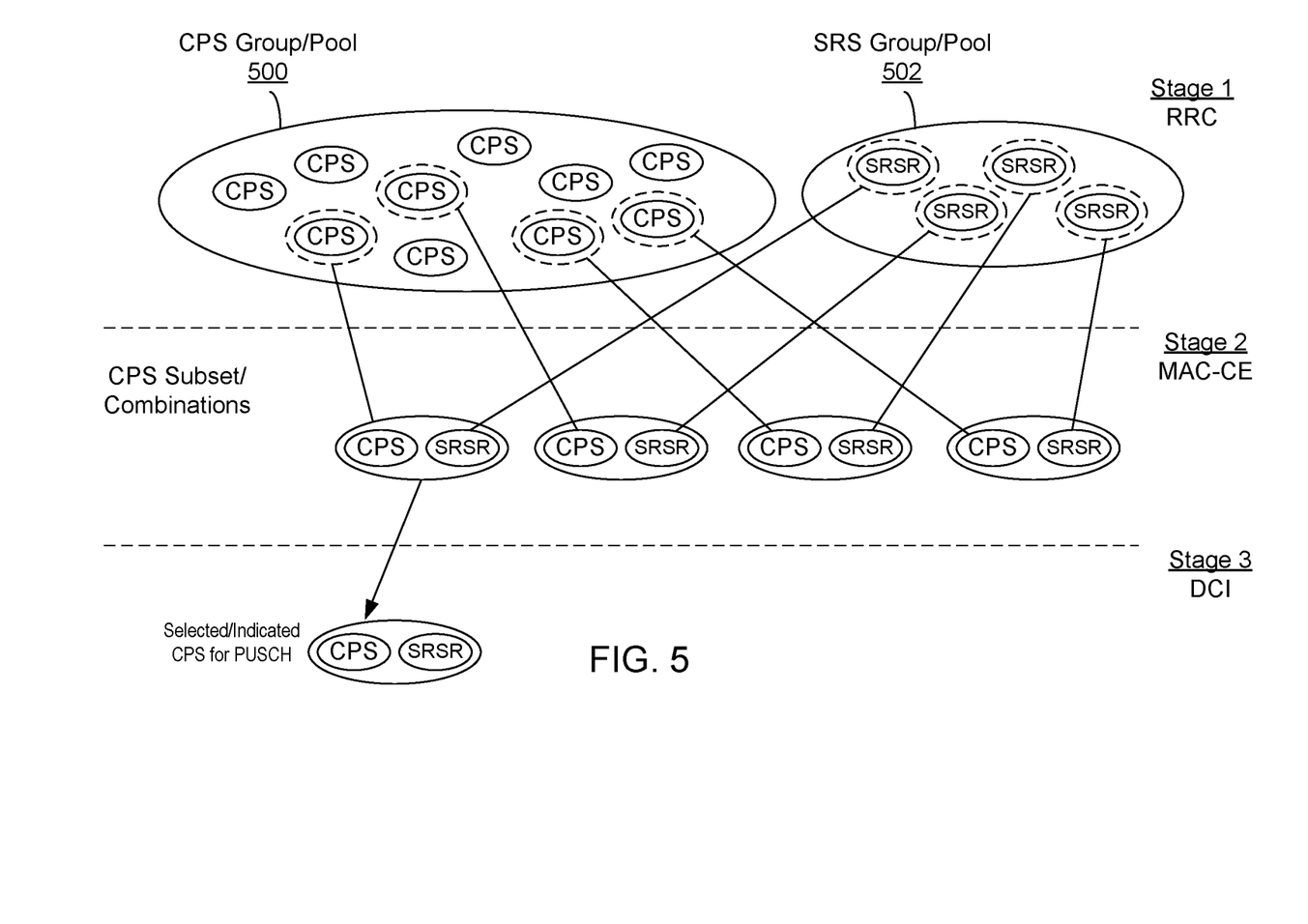
FIG. 5 is a diagram of forming a subset of communication parameter sets and associating sounding reference signal (SRS) resources with the communication parameter sets in the subset.

FIG. 5 is a diagram showing another way that the mobile station 102 may determine subsets of communication parameter sets and select a communication parameter set. In a first stage, the mobile station 102 may determine a plurality (such as a group or pool) of communication parameter sets 500, and separately, determine a plurality (such a group or pool) of SRS resources (SRSR). For at least some methods, the pools/groups 500, 502 may be determined in response to receiving one or more commands, such as one or more RRC commands for example. Then, in a second stage, the mobile station 102 may form a subset of communication parameter sets, where each communication parameter set in the subset is from the group/pool 500. In addition, to form the subset, the mobile station 102 associates each communication parameter set in the subset with a SRS resource from the group/pool 502. The mobile station 102 may form the subset and the associations between the communication parameter sets and the SRS resources in response to one or more commands, such as one or more MAC-CE commands. The mobile station 102 may then, in a third stage, select a communication parameter set and an associated SRS resource from the subset, such as in response to the command triggering the uplink data channel transmission.

In other example methods, the mobile station 102 may determine the port parameter to include a plurality of first demodulation reference signal (DMRS) ports. For at least some of these methods, the first DMRS ports are precoded by an identify matrix, or is not generated according to a precoding matrix for the uplink data channel. The first DMRS ports is the same as, or equivalent to, non-precoded DMRS ports. In addition or alternatively, for at least some example methods, the mobile station 102 determines the one or more ports for the uplink data channel transmission to be the same as the plurality of first DMRS ports. For at least some of these methods, the one or more ports corresponds to one or more uplink data channel transmission layers multiplied by a precoding matrix. In addition or alternatively, the mobile station 102 determines the one or more ports from the plurality of first DMRS ports according to a port indicator field from the command triggering the uplink data transmission.

Additionally, for some example methods, the uplink data channel transmission is a codebook based transmission, and for other example methods, the uplink data channel transmission is a non-codebook based transmission. Where the transmission is codebook-based, the mobile station 102 determines precoding information and a number of transmission layers from the command triggering the uplink data channel transmission. Where the transmission is non-codebook based, the mobile station 102 maps the one or more ports for the uplink data channel transmission to one or more DMRS ports of the plurality of first DMRS ports. For at least some methods, the mobile station 102 may perform the mapping by associating the one or more ports for the uplink data channel transmission with the one or more DMRS ports by order based on port indexes of the one or more ports and the one or more DMRS ports. In particular configurations, the indexes of DMRS ports can be mathematically represented by a first vector $z$, the number transmission layers for transmission of the uplink data channel can be mathematically represented by a second vector $y$, and the indexes of the DMRS ports (the first vector $z$) is equal to a number of transmission layers (the second vector $y$) multiplied by a precoding matrix $W$, or $z=Wy$. If the DMRS ports are non-precoded, and the transmission layers are precoded (from the gNB perspective), then the channel response for the non-precoded DMRS ports is known by channel estimation, and the channel response for the respective transmission layers is equal to the DMRS ports multiplied by the inverse matrix of the precoding matrix $W$. In this sense, the inverse matrix of the precoding matrix $W$ is a combined or mixed matrix from the DMRS ports to the uplink data channel transmission layers.

In addition or alternatively, for at least some example methods, the mobile station 102 determines a spatial relation of the plurality of first DMRS ports according to a communication parameter set comprising at least a second RS resource and at least a QCL type parameter. For at least some of these methods, the communication parameter set is associated with the uplink data channel.

In addition or alternatively, the transmission of the uplink data channel corresponding to the plurality of first DMRS ports is periodic, semi-persistent, or aperiodic.

In addition or alternatively, for at least some example methods, the plurality of first DMRS ports comprises one or more DMRS port groups, and the mobile station 102 determines a plurality of communication parameter sets, each associated with a respective DMRS port group.

In addition or alternatively, for at least some example methods where the mobile station 102 transmits an uplink data based on DMRS ports, the mobile station 102 may determine the plurality of first DMRS ports according to at least one of: a maximum number of SRS ports, a maximum number of DMRS ports, or a maximum number of supported transmission layers for the transmission of the uplink data channel. For at least some of these methods, the mobile station determines the plurality of first DMRS ports by a RRC command or a MAC-CE command.

In addition or alternatively, for at least some example methods, the mobile station 102 may transmit multiple uplink data channels, such as two uplink data channels for example. For at least some example methods, the multiple uplink data channel transmissions are adjacent transmissions. For at least some of these methods, the mobile station 102 may receive a command, such as a DCI command, to trigger transmission of each of these uplink data channels. The mobile station 102 may determine one or more second ports according to the plurality of first DMRS ports for transmission of a second uplink data channel, and transmit the second uplink data channel using the one or more second ports. For at least some of these methods, a time difference between the first and second data channel transmissions is less than or equal to X time units, where X is an integer. In particular methods, X is determined according to the mobile station's capability signaling or configured by a RRC or MAC-CE command.

Figure 6:
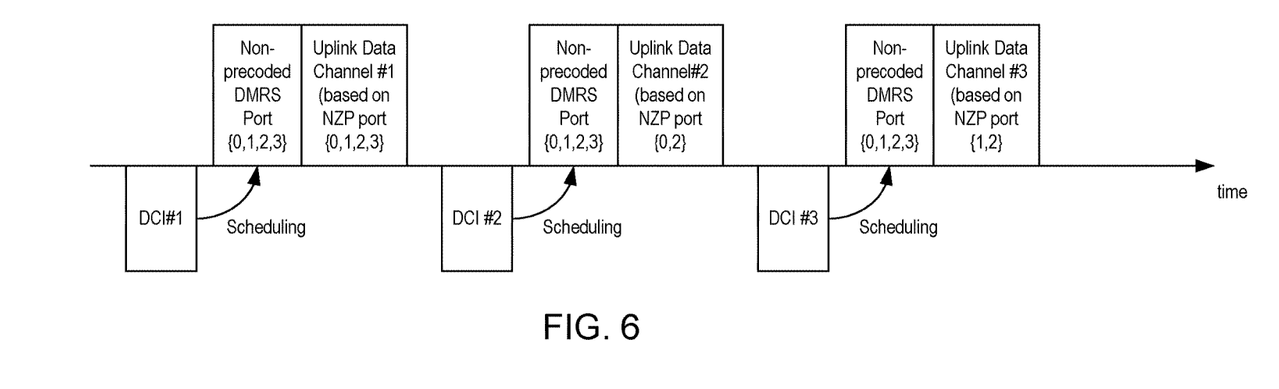
FIG. 6 is a timing diagram of a plurality of uplink data channel transmissions, each associated with non-precoded demodulated reference signal (DMRS) ports.
Figure 7:
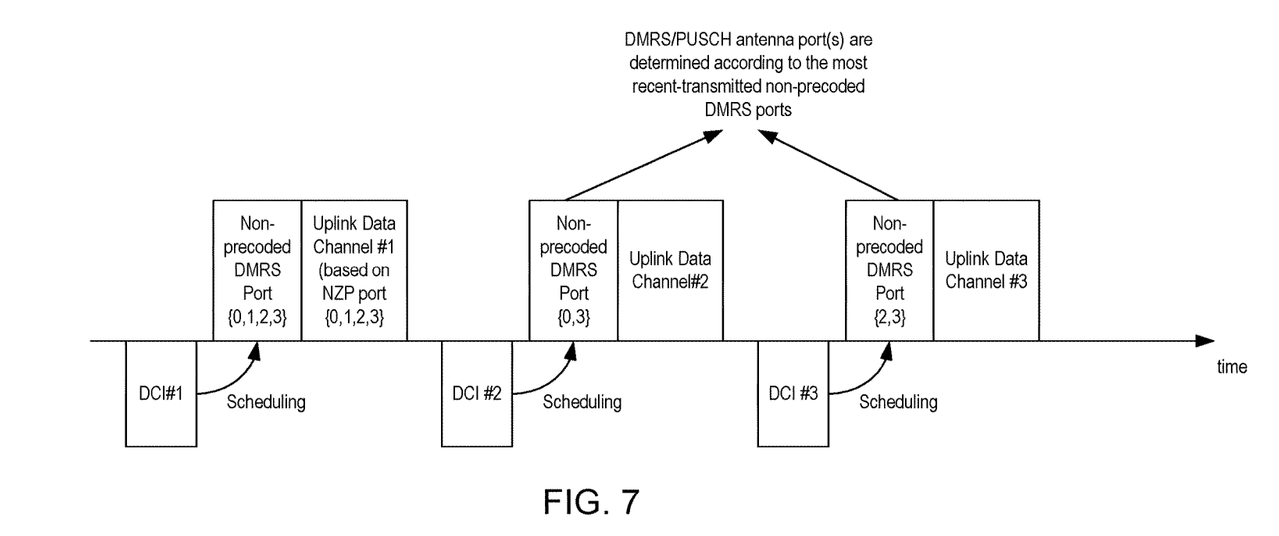
FIG. 7 is a timing diagram of a plurality of uplink data channel transmissions, each associated with non-precoded DMRS ports or precoded DMRS ports.

For at least some example methods, the mobile station 102 may determine the one or more second ports for the second or other subsequent uplink data channel transmissions based on whether the plurality of first DMRS ports used for the second or other subsequent uplink data channel transmission is precoded or non-precoded. FIG. 6 shows a timing diagram of a plurality of (e.g., three) adjacent uplink data channel (e.g., PUSCH) transmissions, where each of the uplink data channels are scheduled for transmission on non-precoded ports. FIG. 7 shows a timing diagram of a plurality of (e.g., three) adjacent uplink data channel (e.g., PUSCH) transmissions, where an initial uplink data channel is transmitted using one or more non-precoded DMRS ports, and one or more subsequent uplink data channels are transmitted using precoded DMRS ports. For both situations, each uplink data transmission is triggered and/or scheduled by an associated command, such as a DCI command. Also, each uplink data transmission includes DMRS information or parameters, or is otherwise associated with a respective DMRS transmission using one or more of the plurality of first DMRS ports.

With particular reference to FIG. 6, where a second and subsequent uplink data transmissions are scheduled on non-precoded DMRS ports, the one or more ports (e.g., one or more second ports, one or more third ports, etc.) used for the second and/or subsequent uplink data channel transmissions are the same as the one or more ports of the plurality of first DMRS ports used for the first uplink data channel transmission. For example, in FIG. 6, the first uplink data channel submission is transmitted using non-precoded DMRS ports {0,1,2,3}, and those same non-precoded DMRS ports {0,1,2,3} are also used for the second and third uplink data channel transmissions scheduled on non-precoded DMRS ports. For at least some example methods, the number of non-precoded DMRS ports is configured by one or more received RRC commands. Then, the mobile station 102 may use one or more non-precoded DMRS ports indicated by a first command (e.g., a first DCI command) scheduling the first uplink data channel transmission. Thereafter, for adjacent uplink data channel transmissions using non-precoded DMRS ports that are scheduled by subsequent commands (e.g., DCI commands, such as DCI #2 and DCI #3 in FIG. 6), the mobile station 102 may use the same non-precoded DMRS ports for the subsequent uplink data channel transmissions as those indicated by the first scheduling command. However, FIG. 6 also shows that since the precoding and/or transmission layer parameters are determined according to the precoding information and number of layers field, for at least some methods, the non-zero-power ports may be different among the plurality of uplink data channel transmissions.

With particular reference to FIG. 7, where a second and/or a subsequent uplink data transmissions are scheduled using precoded DMRS ports, the one or more second ports used for the second or subsequent uplink data channel transmissions may include, but may not necessarily exactly match, the one or more ports of the plurality of first DMRS ports used for the first uplink data channel transmission. For example, the one or more ports for the second and/or subsequent uplink data channel transmissions may be determined from a precoding applied to the plurality of first DMRS ports. Also, for at least some example methods, the mobile station 102 may use the plurality of first DMRS ports because those were used for a most recent transmission using non-precoded DMRS ports. To illustrate, in FIG. 7, the first uplink data channel is scheduled for transmission using non-precoded DMRS ports {0,1,2,3}, the second uplink data channel is scheduled for transmission using precoded DMRS ports {0,3}, and the third uplink data channel is scheduled for transmission using precoded DMRS ports {2,3}.

Additionally, in various embodiments, the mobile station 102 can schedule the non-precoded DMRS ports and the pre-coded DMRS ports dynamically. In addition or alternatively, in various embodiments, when the first uplink data channel (PUSCH #1) is scheduled by a first command (DCI #1) for transmission (which may be codebook-based), and at the same time, the mobile station 102 has scheduled one or more non-precoded DMRS ports (e.g., ports {0,1,2,3}) the mobile station 102 may determine the precoding parameter and/or transmission layers according to precoding information and a number of layers field in the first command. The mobile station 102 may then use those same one or more non-precoded DMRS ports as the one or more ports for the first uplink data channel transmission. Then, the second and third uplink data channel transmissions may be scheduled by second and third commands (e.g., DCI #2 and DCI #3 in FIG. 7), respectively. The mobile station 102 may determine the precoded DMRS ports from non-DMRS ports used in a most-recent transmission, as explained.

In addition or alternatively, for at least some example methods, the mobile station 102 may perform power scaling in conjunction with transmitting an uplink data channel. For an uplink data channel (e.g., a PUSCH) transmission, when the mobile station 102 calculates transmission power according to uplink power control parameters, the mobile station 102 may scale the transmission power by a scaling factor. The mobile station 102 may then split the scaled power equally across the antenna ports on which the mobile station 102 transmits the uplink data channel with non-zero power. In other words, the mobile station 102 determines the transmission power by a scaling factor.

Additionally, for at least some example methods, the mobile station 102 may be configured to perform power scaling in conjunction with a RRC parameter called UL_FullPower_Tx (or ULFPTx), which is a parameter that enables or disables the mobile station 102 with a full power transmission scheme in accordance with, or as defined in, one or more radio access technology specifications, such as 5G NR for example. The mobile station 102 may also operate in different modes in the full power transmission scheme, including a first mode and a second mode, in accordance with, or as defined by, one or more radio access technology specifications, such as 5G NR. When the mobile station 102 is operating with the full power transmission scheme enabled, the mobile station 102 may be considered to be configured with the full power transmission scheme, and/or configured with ULFPTx. Additionally, when the mobile station 102 is operating with the full power transmission scheme disabled, the mobile station 102 may be considered to be not configured with the full power transmission scheme, and/or not configured with ULFPTx. Also, when configured with ULFPTx, the mobile station 102 may be configured to have the first mode (full mode 1) enabled or the second mode (full mode 2) enabled.

In accordance with these full power transmission scheme features, for at least some example methods, where the uplink data channel transmission is codebook based, the mobile station 102, in response to ULFPTx not being configured or ULFPTx being configured and full mode 1 is enabled, determines a scaling factor for a transmission power at which the uplink data channel is transmitted according to at least one of: a maximum number of ports of the uplink data channel used for transmission of the uplink data channel that mobile station (UE) 102 supports; a maximum number of first DMRS ports that the mobile station 102 supports; or a maximum number of SRS ports that the UE supports.

In addition or alternatively, for at least some example methods, where the uplink data channel transmission is codebook based, the mobile station 102, in response to ULFPTx being configured and full mode 2 is enabled, determines a scaling factor for a transmission power at which the uplink data channel is transmitted according to at least one of: a number of ports for the uplink data channel transmission; a number of first DMRS ports; or a number of SRS ports in one or more SRS resources associated with an indicated communication parameter set.

Also, for at least some example methods where ULFPTx is configured and full mode 2 is enabled, the mobile station 102 determines the scaling factor according to one or more of the following: (a) based on a number of ports configured in the port parameter for the uplink data channel transmission, and in particular, according to a ratio of a number of ports with non-zero power for transmission of the uplink data channel over the number of ports of the uplink data channel; (b) based on a number of DMRS ports, and in particular, according to a ratio of a number of ports with non-zero power for transmission of the uplink data channel over the number of first DMRS ports; or (c) based on a number of SRS ports in SRS resource(s) associated with an indicated communication parameter set, and in particular, according to a ratio of a number of ports with non-zero power for transmission of the uplink data channel over the number of SRS ports in one or more SRS resources associated with the communication parameter set.

In addition or alternatively, for a least some example methods where ULFPTx is not configured or ULFPTx is configured and full mode 2 is enabled, the mobile station 102 may fix the scaling factor for the uplink data transmission to 1 under a respective TPMI.

In addition or alternatively, for non-codebook based transmission of the uplink data signal, the mobile station 102 may determine that the scaling factor is one, and/or the mobile station may skip power scaling.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
receiving, by a first communication node from a second communication node, a medium access control control element (MAC-CE) signal, the MAC-CE signal indicating a communication parameter set comprising at least a second reference signal (RS) resource and at least a quasi co-location (QCL) type parameter;
determining a spatial relation of a sounding reference signal (SRS) resource of one or more SRS resources according to the second RS resource in the communication parameter set, wherein the second RS resource is associated with a QCL type-D parameter;
associating, by the first communication node, the one or more SRS resources with the communication parameter set;
receiving, by the first communication node from the second communication node, a downlink control information (DCI) to schedule transmission of a physical uplink shared channel (PUSCH);
determining, by the first communication node, one or more ports according to one or more SRS ports in the one or more SRS resources, wherein a port parameter associated with the PUSCH comprises the one or more SRS ports; and
transmitting, by the first communication node, the PUSCH using the one or more ports.

2. The method of claim 1, wherein determining the spatial relation comprises determining the spatial relation further according to at least one of:
a hybrid automatic repeat re-quest-acknowledgment (HARQ-ACK) corresponding to a physical downlink shared channel (PDSCH) carrying the MAC-CE signal; or
an occasion or time instance of the SRS transmission.

3. The method of claim 2, wherein the SRS transmission occurs no earlier than or after the first slot that is after a first slot after slot n+3N$_{slot}^{subframe,\mu}$, where the HARQ-ACK corresponding to the PDSCH carrying the MAC-CE signal is transmitted in slot n and N$_{slot}^{subframe,\mu}$ is the number of orthogonal frequency-division multiplexing (OFDM) symbols per subframe for subcarrier spacing configuration µ.

4. A method for wireless communication, comprising:
transmitting, by a second communication node to a first communication node, a medium access control control element (MAC-CE) signal indicating a communication parameter set comprising at least a second reference signal (RS) resource and at least a quasi co-location (QCL) type parameter, and wherein one or more sounding reference signal (SRS) resources is associated with the communication parameter set;
transmitting, by the second communication node to the first communication node, a downlink control information (DCI) to schedule transmission of a physical uplink shared channel (PUSCH) using one or more ports determined according to one or more SRS ports in the one or more SRS resources, wherein a port parameter associated with the PUSCH comprises the one or more SRS ports, and wherein a spatial relation of a SRS resource of the one or more SRS resources is determined according to the second RS resource in the communication parameter set, wherein the second RS resource is associated with a QCL type-D parameter; and
receiving, by the second communication node, the PUSCH on the one or more ports.

5. The method of claim 4, wherein the spatial relation is further determined according to at least one of:
a hybrid automatic repeat re-quest-acknowledgment (HARQ-ACK) corresponding to a physical downlink shared channel (PDSCH) carrying the MAC-CE signal; or
an occasion or time instance of the SRS transmission.

6. The method of claim 5, wherein the SRS transmission occurs no earlier than or after the first slot that is after a first slot after slot n+3N$_{slot}^{subframe,\mu}$, where the HARQ-ACK corresponding to the PDSCH carrying the MAC-CE signal is transmitted in slot n and N$_{slot}^{subframe,\mu}$ is the number of orthogonal frequency-division multiplexing (OFDM) symbols per subframe for subcarrier spacing configuration µ.

7. A wireless communications apparatus comprising:
a memory storing a plurality of instructions; and
a processor configured to execute the plurality of instructions, and upon execution of the plurality of instructions, is configured to:
receive a medium access control control element (MAC-CE) signal indicating a communication parameter set comprising at least a second reference signal (RS) resource and at least a quasi co-location (QCL) type parameter;
determine a spatial relation of a sounding reference signal (SRS) resource of one or more SRS resources according to the second RS resource in the communication parameter set, wherein the second RS resource is associated with a QCL type-D parameter;
associate the one or more SRS resources with the communication parameter set;
receive a downlink control information (DCI) to schedule transmission of a physical uplink shared channel (PUSCH);
determine one or more ports according to one or more SRS ports in the one or more SRS resources, wherein a port parameter associated with the PUSCH comprises the one or more SRS ports; and
transmit the PUSCH using the one or more ports.

8. The wireless communications apparatus of claim 7, wherein the processor, upon execution of the plurality of instructions, is configured to determine the spatial relation further according to at least one of:
a hybrid automatic repeat re-quest-acknowledgment (HARQ-ACK) corresponding to a physical downlink shared channel (PDSCH) carrying the MAC-CE signal; or
an occasion or time instance of the SRS transmission.

9. The wireless communications apparatus of claim 8, wherein the SRS transmission occurs no earlier than or after the first slot that is after a first slot after slot n+3N$_{slot}^{subframe,\mu}$, where the HARQ-ACK corresponding to the PDSCH carrying the MAC-CE signal is transmitted in slot n and N$_{slot}^{subframe,\mu}$ is the number of orthogonal frequency-division multiplexing (OFDM) symbols per subframe for subcarrier spacing configuration µ.

10. A wireless communications apparatus comprising:
a memory storing a plurality of instructions; and
a processor configured to execute the plurality of instructions, and upon execution of the plurality of instructions, is configured to:
transmit a medium access control control element (MAC-CE) signal indicating a communication parameter set comprising at least a second reference signal (RS) resource and at least a quasi co-location (QCL) type parameter, and wherein one or more sounding reference signal (SRS) resources is associated with the communication parameter set;
transmit a downlink control information (DCI) to schedule transmission of physical uplink shared channel (PUSCH) using one or more ports determined according to one or more SRS ports in the one or more SRS resources, wherein a port parameter associated with the PUSCH comprises the one or more SRS ports, and wherein a spatial relation of a SRS resource of the one or more SRS resources is determined according to the second RS resource in the communication parameter set, wherein the second RS resource is associated with a QCL type-D parameter; and
receive the PUSCH on the one or more ports.

11. The wireless communications apparatus of claim 10, wherein the spatial relation is further determined according to at least one of:
a hybrid automatic repeat re-quest-acknowledgment (HARQ-ACK) corresponding to a physical downlink shared channel (PDSCH) carrying the MAC-CE signal; or
an occasion or time instance of the SRS transmission.

12. The wireless communications apparatus of claim 11, wherein the SRS transmission occurs no earlier than or after the first slot that is after a first slot after slot n+3N$_{slot}^{subframe,\mu}$, where the HARQ-ACK corresponding to the PDSCH carrying the MAC-CE signal is transmitted in slot n and N$_{slot}^{subframe,\mu}$ is the number of orthogonal frequency-division multiplexing (OFDM) symbols per subframe for subcarrier spacing configuration µ.

* * * * *